Patented Aug. 19, 1952

2,607,762

UNITED STATES PATENT OFFICE 2,607,762

DRY PROCESS MANUFACTURE OF WATER-SOLUBLE DERIVATIVES OF STYRENE-MALEIC ANHYDRIDE TYPE HETEROPOLYMERS

Albert Henry Bowen, Seattle, Wash., assignor to Monsanto Chemical Company, St. Louis, Mo., a corporation of Missouri No Drawing. Application December 7, 1948, Serial No. 64,044

12 Claims. (Cl. 260—78.5)

The present invention relates to improved processes for preparing water-soluble derivatives of heteropolymers of a polymerizable vinyl compound or mixtures of polymerizable vinyl compounds with unsaturated $\alpha,\beta$ dicarboxylic anhydrides, acids and/or half esters of such acids.

One object of the present invention is the provision of a simple and efficient process for the preparation of substantially dry, finely divided, water-soluble derivatives of heteropolymers of a polymerizable vinyl compound or mixture of polymerizable vinyl compounds with unsaturated $\alpha,\beta$ dicarboxylic anhydrides, acids and/or half esters of such acids.

A further object of the present invention is the preparation of water-soluble derivatives of heteropolymers of the type described without first bringing such heteropolymers into solution.

A further object of the invention is the preparation of substantially dry, water-soluble salts or mixtures of salts and amides of heteropolymers of the type described with the use of only small amounts of water.

Still further objects and advantages of the present invention will appear from the following description and the appended claims.

Heteropolymers of a polymerizable vinyl compound or mixtures of polymerizable vinyl compounds with unsaturated $\alpha,\beta$ dicarboxylic anhydrides, acids and/or half esters of such acids are normally water-insoluble although they do possess some tendency to swell in water. Such heteropolymers are quite useful for textile, paper and other applications when they are employed in the form of an aqueous solution. However, since such heteropolymers are normally water-insoluble, they have been dissolved heretofore, for example, in an organic solvent or in water containing an alkali such as caustic soda. The solubility of such heteropolymers in a water solution of caustic soda may be somewhat limited, however, and it is not generally possible to make up a solution containing more than 10% to 40% heteropolymer, depending on the average heteropolymer molecular weight. This is a disadvantage for distributors of such products since it is necessary when shipping such solutions to ship 9 to 1.5 parts of water respectively for every part of polymer, thus making the distribution of such solutions quite expensive not only because of the added bulk and weight, but also because of the nature of the containers employed and the added problem of corrosion of such containers.

In accordance with the present invention it is possible to prepare substantially dry, water-soluble derivatives of normally water-insoluble heteropolymers of the type described without first bringing such heteropolymers into solution, thus obviating the shipping disadvantage hereinbefore referred to and at the same time eliminating intermediate process steps which have heretofore been considered necessary in the preparation of such products.

The invention is carried out in general by reacting a heteropolymer of the type described, for example, a copolymer of styrene-maleic anhydride which is in the form of a finely divided material or powder or fine discrete particles in the presence of a small amount of water with a basic compound which is capable of salt formation with the carboxylic acid groups or carboxylic acid anhydride groups in the heteropolymer, until a water-soluble product or derivative is obtained. As examples of basic compounds which are suitable for use in the present invention may be mentioned alkali-metal hydroxides such as sodium and potassium hydroxides and the like; ammonia; lower aliphatic amines such as lower alkyl primary amines as, for example, methyl amine, ethyl amine, propyl amine and the like, lower alkyl secondary amines as, for example, dimethyl amine, diethyl amine and the like, lower alkyl tertiary amines, as for example, trimethyl amine and the like, lower alkyl hydroxy primary amines as, for example, ethanol amine, propanol amine, and the like, lower alkyl dihydroxy secondary amines as, for example, diethanol amine, dipropanol amine and the like, lower alkyl polyhydric amines as, for example, triethanol amine and the like; and cyclic amines such as morpholine and the like.

The quantity of water employed in the reaction of such basic compounds with the heteropolymers of the type described may be varied to some extent depending upon the particular basic compound used and the specific surface of the heteropolymer which is available for reaction. Satisfactory results are obtained when alkali metal hydroxides are employed if no water is added. It is possible to mix the finely divided or highly porous heteropolymer in such instances with substantially dry appearing, finely divided alkali-metal hydroxide and obtain a sufficient reaction between the constituents without the aid of water. The resulting product is sufficiently water-soluble for most purposes. It is essential, however, when reacting ammonia or amines with such heteropolymers to carry out the reaction in the presence of a small amount of water. However, the quantity of water employed in any instance is preferably not in excess of an amount which will swell the individual particles of heteropolymer without substantially altering the dry feel and appearance of the polymer particles. Since the reaction between such basic compounds and heteropolymers of the type described is exothermic and heat is generated, it is possible to employ enough water to wet the particles initially and then evaporate the excess water from the reaction mixture either by the heat generated during the reaction or by supplying additional heat from an outside source without substantial agglomeration of the heteropolymer particles. Such procedure is applicable, for example, when the reaction is carried out in a suitable mixing apparatus such as a steam jacketed ball mill or other grinding apparatus since if there is any tendency for the particles of the reaction product to agglomerate such agglomerates are readily broken up within the apparatus.

Satisfactory results have been obtained when alkali metal hydroxides are employed by using as much as 35 parts of water for 100 parts of a heteropolymer of styrene with maleic anhydride. However, it is preferred to employ smaller amounts of water, for example, between about 5 and 25 parts of water for 100 parts of such heteropolymer when alkali metal hydroxides are employed. In the case of ammonia and amine satisfactory results have been obtained by using as low as 7 and as high as 35 parts of water for 100 parts of a heteropolymer of styrene with maleic anhydride.

In general, the water employed may be added to the finely divided or highly porous heteropolymer either before the reaction with alkali metal hydroxide, ammonia or amine or it may be added at the same time that such basic compound is being reacted with the heteropolymer. Salt formation is favored in those instances where ammonia or amines are used, when heteropolymer is pretreated with water for a suitable period of time. It is possible, if the pretreatment with water is sufficiently severe, to substantially avoid amide formation. On the other hand, the formation of amides and/or N-substituted carboxylic amides is favored, depending upon whether ammonia or an amine is employed, when the water is first employed at the time the reaction between ammonia or amine and heteropolymer is carried out. In the latter procedure, however, a mixture of ammonium salts and amide ammonium salts is formed. It is desirable, however, to pretreat the heteropolymer with water for a suitable period of time before reaction with higher aliphatic amines since salt formation is favored and the resulting product is water-soluble even though a relatively long chain amine is employed.

It is desirable to add the water to the heteropolymer as uniformly as possible and to avoid excessive addition in certain portions of the mass since best results are obtained when each individual particle of heteropolymer is swollen to a more or less uniform extent. In this manner, gel agglomerates or the formation of gummy masses within the mixture are avoided and a uniform reaction of the basic compound with the heteropolymer is effected.

The reaction between heteropolymer and basic compound is preferably carried out in the presence of water by heating the mixture. Heat not only speeds up the reaction but also assists in vaporizing the water present thus facilitating its removal when the reaction is completed. It is desirable to heat the reaction mixture at atmospheric pressure in a reactor (having an opening of suitable size to allow water vapor to escape) which is completely jacketed, lagged or traced to prevent the condensation of water vapor on the walls of the reactor. By operating in this manner, the formation of gummy masses or gels on the walls of the reactor is substantially avoided. The reaction is carried out until the resulting product is water-soluble and is substantially free of water. The resulting product, however, may contain up to 15% water by weight and still be substantially dry as regards feel, appearance and ability to flow without substantial agglomeration of the individual particles.

The quantity of basic compound which is reacted with the heteropolymer can be varied considerably depending on the conditions of operation, the molecular weight of the heteropolymer, and the nature of the basic compound used, that is, whether an alkali-metal hydroxide, ammonia or an amine is employed, and the desired pH of an aqueous solution of the final product. Thus when alkali-metal hydroxides are employed, it is possible to employ as low as 0.1 mol of such hydroxide for each mol of available carboxyl radical in the heteropolymer and as much as 1 mol of hydroxide for each mol of available carboxyl radical may also be employed. On the other hand, it is desirable to employ a sufficient amount of ammonia or amine, when such basic compounds are used, to form water-soluble products containing at least 0.25 mol of combined ammonia or amine for each mol of available carboxyl radical in the heteropolymer. Sufficient ammonia or amine may be used to form water-soluble products containing as high as 1 mol of combined ammonia or amine for each mol of available carboxyl acid radical in the heteropolymer.

It is essential in carrying out the present invention that the heteropolymer employed be finely divided or powdered, that is, possess a fairly high specific surface. Lumps of dense polymer will not afford sufficient surface to react with the basic compound even though small amounts of water are employed. It has presently been found that the rate and completeness of the reaction is increased as the particle size of the heteropolymer employed is decreased. It is possible, however, to employ larger size particles of heteropolymer when alkali-metal hydroxides are used as reactants. Thus satisfactory results have been obtained in such instances when a major portion of the particles of polymer used pass through a 60 mesh screen and all of the particles pass through a 40 mesh screen. In the case of ammonia and amine reactions with the heteropolymer, it is preferable to employ particles or polymer which are even finer.

The heteropolymers employed in accordance with the present invention may be prepared from a variety of polymerizable vinyl compounds together with unsaturated $\alpha,\beta$ dicarboxlic anhydrides, acids and/or half esters thereof. As examples of polymerizable vinyl compounds which are employed in their manufacture may be mentioned styrene, ring substituted styrenes such as ring substituted chloro styrenes and methyl styrenes, vinyl acetate, vinyl chloride and the like or mixtures of such compounds.

As examples of unsaturated $\alpha,\beta$ dicarboxylic anhydrides which are employable together with such vinyl compounds may be mentioned maleic anhydride, chloro maleic anhydride, citraconic anhydride and the like. As examples of unsaturated α,β dicarboxylic acids which are useful in forming such heteropolymers may be mentioned maleic acid, fumaric acid, mesaconic acid and the like. The lower alkyl half esters and lower alkyoxy half esters of such acids may also be employed instead of such anhydrides or acids. It is desirable, however, when copolymerizing such half esters together with vinyl compounds to also use a minor per cent of such acid or anhydride in order to provide more potentially available hydroxyl groups and thus increase the water solubility of the reaction product of the heteropolymer with a basic compound such as alkali metal hydroxide. It is preferred to employ in the practice of the present invention heteropolymers prepared from styrene together with maleic anhydride, and from styrene-maleic anhydride and a minor amount, based on the maleic anhydride, of a methyl half ester of maleic acid.

The above described vinyl compounds and unsaturated α,β dicarboxylic anhydride, acids or half esters of such acids and mixtures thereof may be polymerized together to form heteropolymers by any suitable procedure. A suitable method for preparing heteropolymers of the type described is to react the vinyl compound such as styrene together with an unsaturated α,β dicarboxylic anhydride such as maleic anhydride in mass, without the use of solvent, and at elevated temperatures, for example, 50° to 70° C. during the period of rapid heat evolution and above about 100° C. during the final stages of the reaction. It is preferred, however, to carry out the mass polymerization in the presence of a minor amount, based on the maleic anhydride, of a methyl half ester of maleic acid. The heteropolymer is generally obtained in the form of a hard, resinous mass which is then comminuted to the desired particle size by grinding, pulverizing and the like.

Heteropolymers of the type described may also be suitably prepared by reacting, for example, styrene with maleic anhydride, in an aliphatic or aromatic hydrocarbon which is a solvent for the monomers, but is a non-solvent for the heteropolymer formed therein. It is also desirable to carry out this reaction in the presence of a peroxide catalyst such as benzoyl peroxide. The copolymer formed is separated from the liquid phase by filtration, centrifuging and the like and the hydrocarbon contained therein is then evaporated by mild heating. When completely dry such copolymer is obtained as a finely divided material which may be used directly in the process of the present invention. Further comminution of the heteropolymer may be carried out, however, if desired.

Still other methods of preparing heteropolymers of the type described may be used as will be apparent to those skilled in the art, and it is not intended that the process described herein is limited to any particular method of preparing the heteropolymer employed.

The proportions of vinyl compound and unsaturated α,β dicarboxylic anhydride, acid and/or half ester thereof employed may be varied to a considerable extent depending upon the monomers used and the intended use of the aqueous solution of the polymer after it has been converted to a water-soluble product by the process described herein. In general, the water-solubility of the sodium and ammonium salts of the heteropolymers tend to decerase as the quantity of styrene used in the preparation of the polymer is increased. Satisfactory water-solubility is obtained when the sodium and ammonium salts are formed from a copolymer containing as little as 40% maleic anhydride or other suitable anhydride, acid and/or half ester thereof when styrene is employed as a co-monomer. It is preferred, however, to employ the different types of monomers, that is, styrene and maleic anhydride, in substantially equimolecular proportions. In the case of heteropolymers prepared from styrene and half esters of maleic acid, the original monomers may be present in a molar ratio of about 1.5 mols of styrene to 1 mol of half ester of maleic acid or mixture of such half ester and maleic anhydride.

A further understanding of the present invention will be obtained from the following specific examples which are intended to be illustrative, but not limitative of the present invention, parts and percentages being by weight.

Example I

Fifty parts of minus 60 mesh styrene-maleic anhydride copolymer (containing approximately 48% combined maleic anhydride and 52% combined styrene) were thoroughly mixed with 22 parts of a 49% sodium hydroxide solution. The heat of reaction volatilized a part of the water present and 66 parts of reaction product were recovered in the form of a dry powder having essentially the same particle size as the original copolymer particles. This powder which is a dry sodium salt of styrene-maleic anhydride copolymer was readily soluble in water and dissolved therein to form an aqueous solution having a pH between 7.3 and 7.5.

Example II

Three hundred and twenty parts of minus 60 mesh styrenemaleic anhydride copolymer (having the same composition as that employed in Example I) were poured into a jacketed Baker-Perkins mixer which was heated by stem. One hundred and fifty-one parts of 49% sodium hydroxide solution were then added dropwise to the copolymer particles in the mixed over a period of about 20 minutes and the copolymer was continuously mixed during this addition. The temperature of the contents of the mixer was maintained between about 60 and 80° C. during the addition of sodium hydroxide and during an additional 3 minute mixing period after addition of sodium hydroxide had been completed. The resulting product, which was a sodium salt of the styrene-maleic anhydride copolymer, was then discharged from the mixture as a substantially dry, free-flowing powder containing particles of substantially the same size as the original particles of copolymer. This product was readily soluble in water.

Example III

Eighty parts of substantially dry minus 40 mesh styrene-maleic anhydride-methyl half ester of maleic acid heterpolymer (containing about 54% combined styrene, 37% combined maleic anhydride and 9% combined methyl half ester of maleic acid) were charged to a steam-jacketed and traced Robinson ribbon mixer. Approximately 44 parts of 49% sodium hydroxide solution were fed from a charge tank through a distributing head into the mixer over a period of about 3 minutes. The resulting mixture was thoroughly mixed for an additional 30 minutes at a temperature of approximately 70° C. to allow complete reaction and the vaporization of a portion of the water present. Approximately 111 parts of the sodium salt of the heteropolymer (containing about 8% moisture) were produced. The material was removed from the mixed in the form of a substantially dry, finely divided powder which was readily soluble in water. A 5% solution of this powder in water had a pH between about 7.5 and 8.3.

*Example IV*

Approximately 100 parts of minus 60 mesh styrene-maleic anhydride-secondary butyl half ester of maleic acid heteropolymer (containing approximately 48% combined styrene, 18% combined maleic anhydride and 34% combined secondary butyl half ester of maleic acid) were thoroughly mixed with 28 parts of 50% sodium hydroxide solution for a period of 30 minutes. The heat of reaction during the formation of the sodium salt of the heteropolymer vaporized a portion of the water present. The resulting product was recovered in the form of a substantially dry finely divided powder which was readily soluble in water.

*Example V*

Approximately 7180 parts of powdered styrene-maleic anhydride copolymer (containing about 52% combined styrene and 48% combined maleic anhydride) were charged to a ball mill. Six hundred and eight parts of water were then introduced into the ball mill which was subsequently sealed and put into operation for 30 minutes. Excess ammonia gas was then introduced into the rotating ball mill under pressure for a period of approximately 3 hours. The resulting product was then recovered from the mill in the form of a white, substantially dry, free-flowing powder which was water-soluble. This powder consisted primarily of a mixture of styrene-maleic copolymer ammonium salt and amide.

*Example VI*

Approximately 202 parts of powdered styrene-maleic anhydride copolymer (containing approximately 52% combined styrene and 48% combined maleic anhydride) and 18 parts of water were mixed in a closed rotating ball mill for a period of 30 minutes. Gaseous monoethylamine was then introduced under pressure into the rotating ball mill for an additional 30 minutes. The resulting product was removed from the mill and aerated to remove unreacted monoethylamine. A fine, substantially dry, white powder was obtained. Ten parts of this powder dissolved readily in 90 parts of water.

The water-soluble derivatives of the type described as produced in accordance with the present invention may be used for many purposes. Thus they are useful for furnishing textiles, as thickening agents, as emulsifying agents or protective colloids in dry, powder paints, as film-formers, and as adhesives.

The methods and procedures described herein may be varied considerably as will be apparent to those skilled in the art, and it is intended that the present invention be limited only by the scope of the appended claims.

What is claimed is:

1. The process which comprises reacting in the presence of water a finely divided heteropolymer of a polymerizable vinyl compound and a compound selected from the group consisting of aliphatic unsaturated $\alpha,\beta$ dicarboxylic anhydrides, acids, half esters of such acids and mixtures thereof, with a basic compound selected from the group consisting of alkali-metal hydroxides, ammonia, lower aliphatic amines and morpholine, until a water-soluble product is obtained the ratio of water to heteropolymer not being in excess of about 35:100 in parts by weight, said reaction being carried out in the absence of an organic solvent.

2. The process which comprises reacting in the presence of water a finely divided heteropolymer of a polymerizable vinyl compound and a compound selected from the group consisting of aliphatic unsaturated $\alpha,\beta$-dicarboxylic anhydrides, acids, half esters of such acids and mixtures thereof, with a basic compound selected from the group consisting of alkali-metal hydroxides, ammonia, lower aliphatic amines and morpholine, until a water-soluble product is obtained, the quantity of water not being in excess of about 35 parts by weight per 100 parts heteropolymer but sufficient to swell the heteropolymer without substantially altering the feel and appearance of such heteropolymer, said reaction being carried out in the absence of an organic solvent.

3. The process which comprises reacting in the presence of water a finely divided heteropolymer of a polymerizable vinyl compound and a compound selected from the group consisting of aliphatic unsaturated $\alpha,\beta$-dicarboxylic anhydrides, acids, half esters of such acids and mixtures thereof, with a basic compound selected from the group consisting of alkali-metal hydroxides, ammonia, lower aliphatic amines and morpholine, until a water-soluble product is obtained, the quantity of water not being in excess of about 35 parts by weight per 100 parts heteropolymer, the heteropolymer being pretreated with the water before it is reacted with the basic compound.

4. The process which comprises reacting a heteropolymer of styrene and maleic anhydride, which is in the form of a finely divided material, with sodium hydroxide, in the presence of water until a water-soluble product is obtained, the quantity of water supplied being insufficient to cause substantial agglomeration of said heteropolymer and being in the range of about 5 to 25 parts by weight for each 100 parts of heteropolymer.

5. The process which comprises reacting a heteropolymer of styrene and maleic anhydride, which heteropolymer is in the form of a finely divided material, with ammonia in the presence of water until a water-soluble product is obtained, the quantity of water supplied being insufficient to cause substantial agglomeration of said heteropolymer and being in the range of about 7 to 35 parts by weight for each 100 parts of heteropolymer.

6. The process which comprises reacting a heteropolymer of styrene and maleic anhydride, which heteropolymer is in the form of a finely divided material with monomethyl amine in the presence of water until a water- soluble product is obtained, the quantity of water supplied being insufficient to cause substantial agglomeration of said heteropolymer and being in the range of about 7 to 35 parts by weight for each 100 parts of heteropolymer.

7. The process which comprises reacting a heteropolymer of styrene, maleic anhydride and a minor proportion, based on said maleic anhydride, and a methyl half ester of maleic acid, which heteropolymer is in the form of a finely divided material, with sodium hydroxide in the presence of water until a water-soluble product is obtained, the quantity of water supplied being insufficient to cause substantial agglomeration of said heteropolymer and being in the range of about 5 to 25 parts by weight for each 100 parts of heteropolymer.

8. The process which comprises reacting a heteropolymer of styrene, maleic anhydride and a minor proportion based on said maleic anhydride, of a methyl half ester of maleic acid, which heteropolymer is in the form of a finely divided material, with ammonia in the presence of water until a water-soluble product is obtained, the quantity of water supplied being insufficient to cause substantial agglomeration of said heteropolymer and being in the range of about 7 to 35 parts by weight for each 100 parts of heteropolymer.

9. The process which comprises reacting a heteropolymer of styrene, maleic anhydride and a minor proportion, based on said maleic anhydride, of a methyl half ester of maleic acid, which heteropolymer is in the form of a finely divided material, with monomethyl amine in the presence of water until a water-soluble product is obtained, the quantity of water supplied being insufficient to cause substantial agglomeration of said heteropolymer and being in the range of about 7 to 35 parts by weight for each 100 parts of heteropolymer.

10. The process which comprises reacting a heteropolymer of styrene, maleic anhydride and secondary butyl half ester of maleic acid, which heteropolymer is in the form of a finely divided material, with sodium hydroxide in the presence of water until a water-soluble product is obtained, the quantity of water supplied being insufficient to cause substantial agglomeration of said heteropolymer and being in the range of about 5 to 25 parts by weight for each 100 parts of heteropolymer.

11. The process which comprises reacting a finely divided heteropolymer of polymerizable vinyl compound and a compound selected from the group consisting of aliphatic unsaturated $\alpha,\beta$ dicarboxylic anhydrides, acids, half esters of such acids and mixtures thereof, with a substantially dry appearing alkali-metal hydroxide until a water-soluble product is obtained.

12. The process which comprises reacting in the absence of an organic solvent a finely divided heteropolymer of a polymerizable vinyl compound and a compound selected from the group consisting of aliphatic unsaturated $\alpha,\beta$ dicarboxylic anhydrides, acids, half esters of such acids and mixtures thereof, with a basic compound selected from the group consisting of alkali-metal hydroxides, ammonia, lower aliphatic amines and morpholine, the reaction between the heteropolymer and the basic compound being carried out, until a water-soluble product is obtained in the presence of about 0–35 parts by weight of water for each 100 parts of heteropolymer.

ALBERT HENRY BOWEN.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,286,062 | Condo et al. | June 9, 1942 |
| 2,300,566 | Hahn et al. | Nov. 3, 1942 |
| 2,324,739 | Stoops et al. | July 20, 1943 |
| 2,456,177 | Cupery | Dec. 14, 1948 |
| 2,458,639 | Quarles | Jan. 11, 1949 |